May 22, 1951 M. DEN HERTOG 2,553,553

SELECTOR SWITCHING SYSTEM

Filed Feb. 4, 1947

INVENTOR.
MARTINUS DEN HERTOG
BY
Robert Harding Jr.
ATTORNEY

Patented May 22, 1951 2,553,553

UNITED STATES PATENT OFFICE 2,553,553

SELECTOR SWITCHING SYSTEM

Martinus den Hertog, Antwerp, Belgium, assignor to International Standard Electric Corporation, New York, N. Y., a corporation of Delaware Application February 4, 1947, Serial No. 726,357
In the Netherlands September 7, 1942

Section 1, Public Law 690, August 8, 1946
Patent expires September 7, 1962

8 Claims. (Cl. 179—18)

Figure 1:
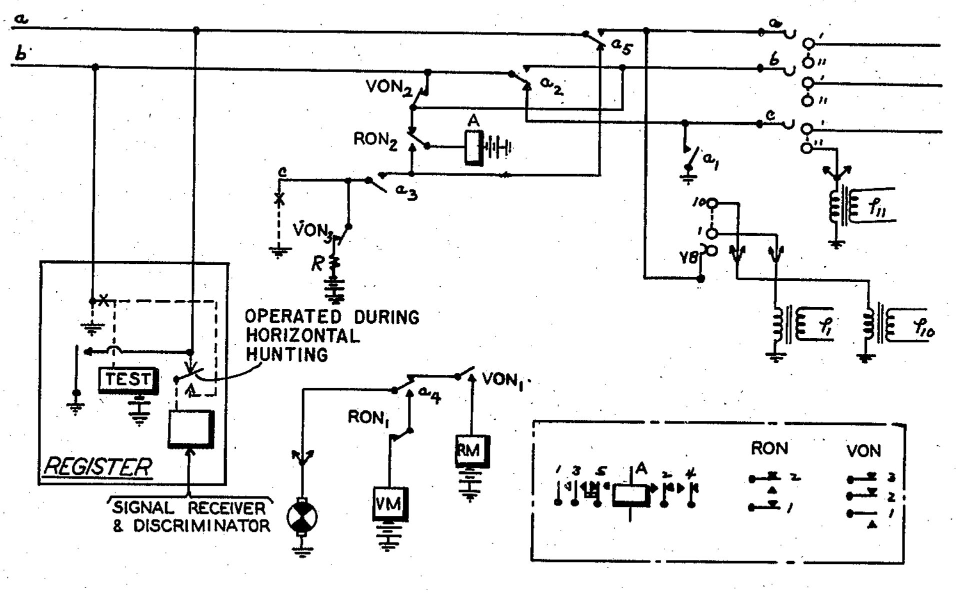

The invention relates to a switching arrangement in or for a telecommunication system, comprising one or more stages of group selectors and/or a stage of final selectors, by means of which a connection may be extended to a called line or junction or a free one out of a group of called lines or junctions, under control of one of a group of common register controllers, which govern the selecting and hunting motions of the switches in all switching stages.

The invention relates more specially to switching arrangements in which the selection of any wanted group of outlets or of an individual outlet is controlled from the register controller by means of a number of signalling currents or potentials, differing in at least one electrical characteristic and which are sent from the selector as characteristic signals to denote the groups of outlets or the individual outlet accessible in consecutive positions of the selective member of the selector. Such a selection system is, for instance, described in the applicant's earlier U. S. Patent No. 2,452,578, using discriminating signals for the control of several stages of a signaling system as described in Patent No. 2,424,585.

Said U. S. Patent No. 2,452,578 makes particular reference to the use of so-called single-motion selector switches, i. e., selectors which during one cyclic operation will cause their brushes to pass over all the sets of bank contacts consecutively, a simultaneous selecting and hunting by any one of said switches taking place under the control of the register controller. A signal, characteristic for each group of outlets into which the number of bank contacts is divided, is sent from the moving selector switch to the register controller.

The present invention deals more particularly with two-motion selector switches, such as step-by-step switches. It is, however, applicable also to other types of switches, such as rotary switches having a brush trip spindle and a brush carriage. The invention can further be applied with advantage to single-motion switches.

An object of the invention is that in each selecting stage at least two separate and distinct selecting operations, e. g. motions of the selector, may take place under the control of the register controller. At least one operation is a selection controlled by the discrimination of characteristic signals, and the second operation, e. g. hunting, takes place subsequently and outside of the control of the characteristic signals.

The selecting and hunting operations or motions may take place in two different directions of movement (for example, vertical for the selection and rotary for the hunting), or by the action of different switching elements (for example, a trip spindle for the selecting and a brush carriage for the hunting operation).

All outlets of each group are located together in the contact bank so that they can be reached consecutively without hunting over outlets of other groups. One terminal (the marking terminal) in front of each group gives a characteristic signal for that group. This terminal may be either a separate terminal, or the first one of the group.

When the invention is applied to single motion selectors, then at least one of the selecting motions and the hunting motion take place in the same direction of movement, the hunting motion being a continuation of the preceding selecting motion.

A further feature of the invention is that a characteristic signal is transmitted from a selector to a register controller during the selecting motion every time the selector is in such a condition, that the termination of the selecting motion, and if necessary the ensuing hunting motion, may result in the seizure of the individual outlet or of a free one out of a group of outlets which is identified by said characteristic signal.

Another feature of the invention is that one of a number of sources of characteristic signaling current or potential is connected to each of a group of marking terminals that are wiped over by a selector brush during the selecting motion. These marking terminals are so located that the register responds to the receipt of any one of said signaling currents, stops the selecting motion and starts the hunting motion. Thus, the selector will hunt over a number of outlets designated by the same digit. These marking terminals are separate from but are common to said group of outlets.

It is also a feature of a certain embodiment of the invention that at least one of the selecting motions and the hunting motion take place in the same direction of movement, the hunting motion being a continuation of the preceding selecting motion. The marking terminals are then associated with a set of bank contacts belonging to the first of a number of outlets having the same digital group indication in the selecting stage considered. When during the selecting motion the register responds to the signaling current on any one of said marking terminals, it will change the selecting motion into a hunting motion and cause the selector to hunt for a free one of said number of outlets.

Another feature is that a source of signaling current or potential, differing in at least one electrical characteristic from any of the signaling currents used for identifying numerical groups, is connected to a terminal following the last outlet in each group. This potential or current may be applied also to the set of bank contacts belonging to the last outlet so that, when the selector fails to find a free outlet, this signaling current will operate the register controller to indicate that no free outlet could be found and to stop the hunting action of the selector.

Applicant's U. S. Patent No. 2,431,313 discloses common register means to control the movement of single motion selectors by means of discriminating signals in such a manner that the selector can be caused to select a free outlet in either of two alternative levels or groups of outlets; viz. a preferred level and a second choice level. If no free outlets are available in the preferred level, a free outlet will be selected in the second choice level, and a different discriminating signal will operate the register to make an artificial selection to route the call via an overflow selector to the selector in the wanted group.

Such switching procedure is possible only when a group selector is so arranged that it can reach the outlets of different levels consecutively. This is not the case with two-motion selectors. Besides, each outlet must have a characteristic discriminating signal indicating the group to which it belongs. No such signals are available for the selectors according to the present invention.

It is an object of the invention to provide means whereby a call may be routed to a different level of a single motion or two-motion selector if all outlets in a preferred level are busy or unavailable. When the register controller is signaled that no free outlet can be found, it will cause the selector to return to normal and to recommence the selecting motion, either to the wanted group or to an alternative group. When a free outlet is found to an overflow selector in an alternative group, then an artificial selection may be inserted by the register to direct the overflow selector to a different group of outlets in the wanted direction.

According to another feature, if no free outlet is available in a preferred or in an alternative direction, then the register will cause all selector circuits to return to normal and a busy tone to be connected to the calling line from the register or from another circuit controlled by the register.

Figure 2:
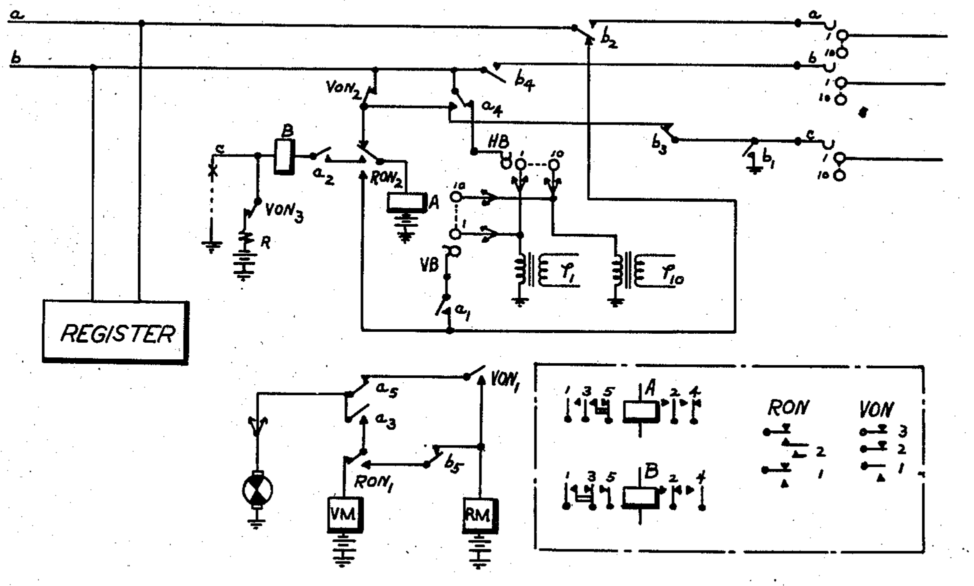

Two embodiments of the invention are diagrammatically illustrated in the drawing, Fig. 1 showing a step-by-step group selector and Fig. 2 a final selector.

For the sake of simplicity, the details of the common register controllers are omitted, and attention is directed to Patent No. 2,452,578.

The advantages to be gained by the application of the invention to the control of two-motion selectors may be readily appreciated by a comparison of the circuit of the step-by-step two-motion group selector shown in Fig. 1, with any well known step-by-step group selector circuit. The number of the relays and their construction, and the number of auxiliary contacts on the selector have been very considerably reduced or simplified. The well known type of step-by-step group selector circuit has three relays with a total of 5 inductive windings and 23 contact springs, as compared with the single relay with one winding and 11 contact springs shown herein. Instead of the customary four auxiliary contacts with a total of 15 springs, the circuit of Fig. 1 requires two with a total of 11 springs, to which should be added a vertical contact row, such as is very often provided for step-by-step selectors used as line finders.

The operation of the circuit shown in Fig. 1 is as follows:

A free selector is characterized by the presence, on the "c" wire, of a free battery potential supplied through a resistance R via a break contact of the vertical off normal contact $VON_3$. When a hunting selector in the preceding stage stops on this selector, it will connect a direct ground to the "c" inlet, thereby rendering the seized selector busy. The "a" and "b" wires are metallically connected through to the register circuit which controls all operations of the selector. The register controller connects a signal receiver to the "a" wire to respond to a particular predetermined signal, depending on the selection to be made. These signals may, for instance, consist of multi-phase alternating potentials, each phase designating a different group of outlets in the selector banks. For particulars reference is made to Patent No. 2,424,585.

When the register controller has received that digit from the calling party which must control the setting of the selector switch of Fig. 1, it connects a full ground to the "b" wire, whereupon relay A operates via a break contact of the vertical off normal contact $VON_2$ and a break contact of the rotary off normal contact $RON_2$. Make contact $a_2$ of relay A bridges the vertical off normal contact so that when the switch starts its vertical movement and opens this contact, the circuit of relay A will be maintained over this make contact. Make contact $a_4$ of relay A applies interrupted ground from a common interrupter to the vertical magnet VM over break contact of $RON_1$. The selector starts to lift its brush carriage, and in so doing sweeps a vertical brush VB over the vertical marking contacts which are connected to different sources of signaling current, so that the level to which the selector is stepped is signaled over the "a" wire and $a_5$ front to the register controller by the characteristic signal present on the selected marking contact.

Fig. 1 indicates that the characteristic signals are obtained by using alternating currents with different phase shifts, the vertical marking contact corresponding to level 1 being connected to the current source with phase $\phi_1$; the vertical marking contact corresponding to level 2 to the source $\phi_2$, etc. When the selector reaches the level which corresponds to the digit dialed by the subscriber, the signal receiver at the register controller operates and removes the ground from the "b" wire, whereupon relay A falls off. Make contact $a_4$ immediately opens the circuit of the vertical magnet, stopping the vertical motion, and the break contact $a_4$ closes a circuit for the rotary magnet RM from interrupted ground over the make contact of $VON_1$, which is now closed. The switch starts its rotary motion, and in so doing the brush VB leaves the selected marking contact and disconnects the source of alternating signaling current from the "a" wire.

Upon release, relay A disconnects its winding from the "b" wire, and connects the latter to the "c" brush of the selector via break contact $a_2$. As soon as the first horizontal step has been made the rotary off normal contact $RON_2$ connects the winding of relay A to the "a" wire over break contact $a_5$.

The selector now hunts for a free outlet in the selected level, which is characterized by the presence of a free battery potential on the "c" wire to connect it via the "b" wire to the register controller where a test relay TEST is connected to the "b" wire during hunting. The test relay connects ground to the "a" wire and causes the relay A to energize a second time. Relay A disconnects interrupted ground from the rotary magnet at break contact $a_4$, stopping the rotary movement, and locks itself to the ground on the "c" wire over make contact $a_3$ and make contact $RON_2$. It should be noted that the make contact $a_3$ closes before break contact $a_5$ opens.

At make contacts $a_5$ and $a_2$, the "a" and "b" wires are switched through to the brushes of the selector, so that the register is now connected to the next selector switch, which has just been seized. At the same time full ground is placed on the "c" brush of the selector by contact $a_1$, thereby rendering the seized selector definitely busy. This condition persists until the end of the connection. While the relay A is operated, the interrupted ground cannot again be connected to the vertical magnet, because the circuit is opened at break contact $RON_1$. The test potential is controlled by break contact $VON_3$ so that battery is connected to the "c" wire only through the winding of relay A which has a sufficiently high resistance to prevent seizure at the moment the holding ground is removed at the preceding selector.

Release is initiated by the removal of ground from the "c" wire at the preceding selector. The selector is of the type which restores by rotating all the way to the end of the bank, whereupon the wipers drop to the lowermost position and are returned to normal by a spring wound up by the forward rotary movement. When, therefore, relay A releases, it reconnects the interrupted ground to the rotary magnet via break contact $a_4$ and $VON_1$, whereupon the brushes will be rotated past the last terminal in the bank. The selector brushes will then drop back to normal and open the $VON_1$ contact before a next impulse can arrive.

Let us now assume that no free outlet is found in the selected level. In this case, the brush carriage will go to the 11th terminal in the arc to which a signaling current with a phase shift $\phi 11$ is connected. During hunting the signal receiver at the register is connected to the "b" wire in parallel with the test relay, so that when the 11th terminal is reached, the signal receiver operates and indicates to the register controller that no free outlet could be found. This may then cause the whole train of switches to be released and send a busy tone to the calling subscriber.

Alternatively, the register may be arranged for routing the call via a different level of the same selector and an overflow selector, by means of a further artificial selection, to a different group of outlets leading in the desired direction in one of the ways disclosed in U. S. Patent No. 2,431,313. If the register controller is arranged for this kind of service the operation is as follows:

When the signaling current found on the 11th terminal is sent to the register controller, this switches itself back in the condition for selection; i. e. it will connect ground to the "b" wire and the signal receiver to the "a" wire. As relay A at the selector is not operated, the latter continues to rotate past the 11th terminal when it automatically restores to normal. Relay A will then reenergize to the ground on the "b" wire via break contacts $VON_2$ and $RON_2$ because the switch has returned to normal. Relay A connects the interrupted ground to the vertical magnet, and the selector is lifted in the same way as the first time, until it reaches the alternative level to which the register controller now directs it. The signal receiver now causes the selector to stop at the alternative level instead of the preferred level, and when this is found the register will cause an additional selection to be made in the overflow selector thus seized to route the call back to a group of outlets in the direction desired.

If no free outlet is found in the alternative level, the register may, for instance, cause the original selection to be repeated, to find out whether in the meanwhile an outlet has become free, or alternatively, it may route the selector to still another alternative level, or it may abandon the call and return all switches to normal sending a busy tone to the calling subscriber. Any of these alternatives can easily be carried out by a suitable arrangement of the register in any of the ways disclosed in the above-mentioned copending application without changing the design of the selector switch.

Instead of the up-and-around step-by-step selector of Fig. 1, other types of two-motion selectors, such as those which make first or rotary and then a radial movement, may be used.

The invention may also be applied to single motion selectors, for example of the rotary type, by grouping all outlets together in one level, and connecting to a terminal preceding each group the characteristic marking potential designating that level. Thus the rotary movement may first be directed to one of the terminals carrying the marking potential until the particular terminal is reached which has the potential to which the signal receiver at the register controller has been set to operate.

The connections at the register controller and at the selector circuit are then changed to connect a test relay at the register to the test brush of the selector. The selector now hunts for a free outlet in the selected group of terminals. At the same time, the signal receiver will be connected in parallel to the test relay, so that when the selector reaches the next terminal on which a marking potential is present, the signal receiver will operate and thus indicate to the register controller that no free outlet could be found in the selected group. For this purpose, the signal receiver will be set to operate on the particular potential connected to the marking terminal next to that on which it operated the first time.

The invention is applicable also to final selectors. In this case, however, there will be two selective operations, and the signal receiver at the register controller will be consecutively connected to control first the tens selection during the vertical movement, and then the units selection during the rotary movement. Fig. 2 shows the circuit of a final selector of the up-and-around step-by-step type which has a fourth brush so arranged that it wipes over a row of terminals indicating the different units positions, and each of which is connected to a different signal source in the same way as is indicated for the vertical marking contacts of Fig. 1. This fourth brush may operate in every respect like the three other selector brushes and wipe over a fourth terminal provided for each of the outlets of the selector to which the 10 sources of alternating current potential are connected, each source representing a different units digit.

Alternatively, the selector may have a single wiper and a single row of contacts operative only during the rotary movement.

P. B. X hunting may be provided for by a third movement, a rotary movement, after the units selection under the control of the register to hunt for a free test potential via the "c" brush. The circuit is brought in the talking condition only after all three operations have taken place, e. g. by the addition of a second relay B, as shown in Fig. 2 which operates as follows:

Free test potential is applied to the "c" wire through a resistance R and break contact $VON_3$. When the preceding selector has connected through to the register and the tens and units digits have been received at the register, ground is applied to the "b" wire and a signal receiver is set to control the tens selection via the "a" wire. The ground on the "b" wire causes relay A to operate via break contact $VON_2$ and break contact $RON_2$. Make contact $a_4$ bridges the vertical off normal contact $VON_2$, so that when the switch starts to lift, the circuit for A remains closed to the "b" wire via its own make contact.

The vertical wiper VB passes over the vertical marking contacts and connects the different sources of signaling potential via make contact $a_1$, break contact $b_2$ and the "a" wire to the register. When the correct number of steps has been made, the signal receiver operates and causes relay A to release by removing ground from the "b" wire. This stops the vertical movement, which took place by the connection of interrupted ground to the vertical magnet via the make contact $a_3$ and break contact $RON_1$, through the vertical magnet VM to battery, and starts the rotary movement for the units selection by connecting the same interrupted ground via break contact $a_5$, make contact $VON_1$ and rotary magnet RM to battery. Relay A, in releasing, disconnects itself from the "b" wire, which is now connected via break contact $a_4$ to the horizontal wiper HB, which passes over marking terminals during the rotary movement. At the same time, the "a" wire, by the release of A, is disconnected from the vertical wiper VB at break contact $a_1$, and after the first rotary step it is connected to the winding of relay A: "a" wire, break contact $b_2$, both make contacts of $RON_2$, winding of A to battery.

The rotary movement continues until the horizontal wiper reaches the marking terminal to which the potential is connected for which the signal receiver at the register is set to operate, i. e. which corresponds to the desired units digit. When this happens, the operation of the signal receiver at the register controller causes a ground to be connected to the "a" wire to energize relay A a second time.

The operation of A has the following consequences:

In the first place, the circuit for the rotary magnet over the break contact $a_5$ is now switched over make contact $a_3$, make contact $RON_1$ and break contact $b_5$. Make contact $a_3$ closes before break contact $a_5$ opens, so that if A should operate while the rotary magnet is still energized from the interrupted ground (it being assumed that the energization of the magnet causes the brushes to move), this circuit is not interrupted and the rotary magnet remains energized until the common ground is opened at the interrupter. During the ensuing opening of the interrupter, the register may test the busy condition of the subscriber's line on which the selector is standing and, if busy, whether or not it is the first of a P. B. X group. The subscriber's line is tested via the "b" wire, which is connected via make contact $a_4$ and break contact $b_3$ to the "c" brush of the final selector, so that the register can determine from the potential existing on the "c" wire of the subscriber's line whether it is busy or free.

Assuming the line to be free when a free potential is found via the "b" wire the register immediately removes the ground from the "a" wire, whereupon relay B energizes in series with relay A in the following circuit: ground from the preceding selector, "c" wire, winding of B, make contact $a_2$, make contact $RON_2$, winding of A to battery. Relay B, by energizing, opens at break contact $b_5$ the circuit for the rotary magnet. Furthermore, relay B connects the "a" and "b" wires through to the "a" and "b" brushes of the selector, at make contacts $b_2$ and $b_4$, and a direct ground to the "c" brush at make contact $b_1$, which closes before break contact $b_3$ opens, thereby keeping the subscriber's line busy.

If the subscriber's line is busy and a single line, then the potential existing on the subscriber's "c" wire is such that this can be recognized by the register which will cause all selectors to release and will send a busy tone to the calling subscriber.

If the line is busy and a first of a P. B. X group, then a different potential will be present on the subscriber's "c" wire, which is recognized by the register controller. The selectors are not released and ground is maintained on the "a" wire, whereby relay B remains short circuited. So long as this is the case, the interrupted ground will continue to be applied via break contact $b_5$ to the rotary magnet and the selector will continue its rotary movement. At this time relay A is operated via the "a" wire, so that via the make contact $a_4$ the "c" brush of the selector is connected to the "b" wire and thence to the register controller.

This rotary movement is continued until either a free subscriber's line or the last line in the P. B. X group is encountered. In the case of a free line, the register will open the ground on the "a" wire, whereupon relay B energizes in series with A over the "c" wire, as described for a single free line. When the last line is encountered, the register controller recognizes this by the increased potential existing on the "c" terminal, and is able to discriminate a busy or free condition of this line, so that in either case it will operate in the same way as above described for a single free or busy line.

Ringing current is sent to the called subscriber's line from a circuit operating under the control of the register which received the signal that the line is free. This circuit may be in the register circuit itself in the last group selector or in an intermediate register link circuit which receive the signal to send ringing current from the subscriber line test arrangement at the register controller.

The ringing tripping arrangement, as well as the battery feeding and supervisory relays are, therefore, provided in fewer circuits than the number of final selectors. A very simple and inexpensive final selector circuit is thus provided, which contains only two relays as compared with five relays carrying a total of 15 inductive windings and 69 contact springs. The two relays of Fig. 2 have only two inductive windings and a total of 22 contact springs.

Another advantage of the invention is that the group and the final selectors can be made to move at any desired speed, independent of the speed at which the digits are dialed. Understeps or oversteps cannot occur because during selection in every position of the switch a positive indication is received of the number of steps taken by the selector.

The invention is applicable also to selectors having a separate set of brushes for each group of outlets or levels, one set being unlatched by the selective action of a trip-spindle or tripping finger, which is either rotated or moved in any other convenient way under the control of the register to a position corresponding to the desired group. The motion of the trip spindle or tripping finger will cause the different sources of potential to be consecutively applied to the register controller.

Instead of a row of marking contacts to which the sources of signaling potential are connected and over which a brush is sweeping during the selecting motion, other arrangements may be used to connect the signaling potential. For example, in the case of a selector of the type referred to in the preceding paragraph, the rotating trip spindle may be provided with a number of notched cams or discs controlling contact springs in such a manner that each contact provides signaling potential from one source and is closed only in one particular position of the trip spindle.

In the case of single motion selectors, the hunting action may also be restricted to one group of outlets. This may be done by applying a potential. e. g. $\psi$ 11 to a marking terminal associated with the last outlet of each group, or alternatively, to a marking terminal located between the last outlet of each group and the first outlet of a following group. This potential ($\psi$11) differs in at least one electrical characteristic from the signaling potentials used to designate numerical groups.

This invention, of course, can be applied also to various other known types of switches than the ones here specified.

What is claimed is:

1. In a telecommunication system having a plurality of groups of lines, circuit means including a selector having groups of terminals in which said lines terminate and brushes cooperating therewith arranged to perform two selecting operations for connecting a calling line with a called line in a desired group, a plurality of sources of characteristic potential differing from one another in at least one electrical characteristic, means for connecting said sources to said terminals, wires for connecting said circuit means with said system and adapted to receive signals for controlling said selector, means responsive to a predetermined signal over a first one of said wires for causing said selector to start one selecting operation, means including a first brush of said selector for connecting certain of said sources successively to a second one of said wires for sending signals back into said system, means for stopping said one selecting operation and starting the other selecting operation upon the termination of said predetermined signal, means including a second brush of said selector for connecting certain other of said sources successively to said first wire as the other selecting operation proceeds, and means for stopping said other selecting operation when a predetermined signal is received over said second wire.

2. In a telecommunication system, the combination according to claim 1, in which the starting means includes a relay having a contact for connecting the first brush of said selector with the second wire.

3. In a telecommunication system, the combination, according to claim 2, in which the means for stopping the one selecting operation and starting the other includes a contact of the relay.

4. In a telecommunication system, the combination, according to claim 1, in which the sources of potential sent successively during the first operation are alternating current sources differing from each other in phase and the sources sent successively during the second operation are direct current potentials.

5. In a telecommunication system, the combination, according to claim 4, in which the last signal associated with a group of terminals and sent during the second operation is a special alternating current signal.

6. In a telecommunication system, having a plurality of groups of lines, circuit means including a selector having groups of terminals in which said lines terminate and brushes cooperating therewith arranged to perform up-and-around step-by-step operations and including an additional brush arranged to sweep over a row of terminals indicating the different units positions, a plurality of sources of characteristic potentials differing from one another in at least one electrical characteristic, means for connecting said sources to said terminals, wires for connecting said circuit means with said system and adapted to receive signals for controlling said selector, means responsive to the receipt of a predetermined signal over a first one of said wires for causing said selector to start one selecting operation, said means including a relay having a contact for connecting the first brush of said selector with a second of said wires, means including said first brush of said selector for connecting certain of said sources successively to a second one of said wires for sending signals back into said system, means for stopping said one selecting operation and starting the other selecting operation upon the termination of said predetermined signals, means including a second brush of said selector for connecting certain other of said sources successively to said first wire as the other selecting operation proceeds, and means including a second relay under control of said first relay for stopping said other selecting operation when a predetermined signal is received over said second wire.

7. In a telecommunication system, the combination, according to claim 6, in which the sources of potential connected successively during the first operation of the selector are alternating current potentials differing in phase from each other and the sources connected successively during the second operation are direct current potentials.

8. In a telecommunication system, the combination, according to claim 7, in which the last signal sent during said second operation is a direct current signal.

MARTINUS DEN HERTOG.

(References on following page)

REFERENCES CITED

The following references are of record in the file of this patent:

UNITED STATES PATENTS

| Number | Name | Date |
|---|---|---|
| 1,886,613 | Wicks | Nov. 8, 1932 |
| 2,257,568 | Mathes | Sept. 30, 1941 |
| 2,341,746 | Taylor et al. | Feb. 15, 1944 |
| 2,424,585 | Simon et al. | July 29, 1947 |
| 2,431,313 | DenHertog | Nov. 25, 1947 |
| 2,447,495 | DenHertog | Aug. 24, 1948 |
| 2,452,578 | Kruithof | Nov. 2, 1948 |
| 2,454,809 | Kruithof et al. | Nov. 30, 1948 |

FOREIGN PATENTS

| Number | Country | Date |
|---|---|---|
| 555,530 | Great Britain | Aug. 26, 1943 |
| 897,775 | France | June 12, 1944 |